United States Patent
Andrade de Souza et al.

(10) Patent No.: US 9,091,291 B2
(45) Date of Patent: Jul. 28, 2015

(54) SECURITY BOLT

(75) Inventors: Wolney Andrade de Souza, Paraiba do Sul RJ (BR); Ricardo de Oliveira Souza, Paraiba do Sul RJ (BR); Alexandrino Dalcent Crivelaro, Paraiba do Sul RJ (BR)

(73) Assignee: ELC Produtos de Seguranca Industria e Comercio Ltda., Paraiba do Sul RJ (BR)

( * ) Notice: Subject to any disclaimer, the term of this patent is extended or adjusted under 35 U.S.C. 154(b) by 314 days.

(21) Appl. No.: 13/825,271

(22) PCT Filed: Sep. 22, 2011

(86) PCT No.: PCT/BR2011/000340
§ 371 (c)(1),
(2), (4) Date: Jun. 17, 2013

(87) PCT Pub. No.: WO2012/040800
PCT Pub. Date: Apr. 5, 2012

(65) Prior Publication Data
US 2014/0147226 A1 May 29, 2014

(30) Foreign Application Priority Data
Sep. 27, 2010 (BR) ....................................... 1003609

(51) Int. Cl.
*E05C 19/10* (2006.01)
*F16B 31/00* (2006.01)
(Continued)

(52) U.S. Cl.
CPC ............... *F16B 31/00* (2013.01); *F16B 31/021* (2013.01); *F16B 41/005* (2013.01)

(58) Field of Classification Search
CPC ...... F16B 31/021; F16B 41/005; F16B 31/00; F16B 39/282
USPC ............... 292/251, 256.67, 256.73, 301, 911, 292/913, 924, 2–5, 8, 43, 39
See application file for complete search history.

(56) References Cited

U.S. PATENT DOCUMENTS

| 4,037,515 A | 7/1977 | Kesselman |
| 5,584,625 A | 12/1996 | Petri |

(Continued)

FOREIGN PATENT DOCUMENTS

| EP | 0688960 A1 | 12/1995 |
| GB | 2265850 A | 10/1993 |

OTHER PUBLICATIONS

The International Bureau of WIPO, International Preliminary Report on Patentability for Application No. PCT/BR2011/000340, dated Apr. 11, 2013, 6 pages, Switzerland.

(Continued)

*Primary Examiner* — Mark Williams
(74) *Attorney, Agent, or Firm* — Alston & Bird LLP

(57) ABSTRACT

The present invention relates to a security bolt understand a threaded bolt screw body (2) topped by an intermediate part (4) and a bolt head (3), joined together by weakened connections links (5, 6), the weakened connection (5) between the intermediate part and the bolt head torque being less resistant to torque than the weakened connection (6) between the intermediate part (4) and threaded body (2). A cap (8) covers the bolt head (3), the intermediate part (4) and the two weakened connections (5, 6), and is engaged in its lower region with a ring (7) positioned below the intermediate part, around the threaded body (2). The top surface of the cap (8) is formed with an lower formation (12) that cooperates with a formation (13) on the bolt head (3) to transmit rotation of the screw body. After a torque threshold, the first weakened connection (5) breaks, allowing the cap to rotate without transmitting the rotation to the screw. Both the cap (8) and the screw body (2) are individualized with the same or complementary alphanumeric identification. The top of the screw body 2 is formed with a diametric rib (14) that can be used to unscrew the screw when the second weakened connection (6) is physically ruptured by manipulation of the cap (8) and the assembly comprising the cap, the bolt head and the intermediate part so released is removed to uncover the screw body and its upper rib (14).

10 Claims, 12 Drawing Sheets

(51) Int. Cl.
*F16B 31/02* (2006.01)
*F16B 41/00* (2006.01)

(56) References Cited

U.S. PATENT DOCUMENTS

| | | | |
|---|---|---|---|
| 5,713,705 A * | 2/1998 | Grunbichler | 411/5 |
| 6,062,783 A * | 5/2000 | Austin | 411/57.1 |
| 6,065,186 A * | 5/2000 | Jermyn, Jr. | 16/86 R |
| 8,398,345 B2 * | 3/2013 | Pratt | 411/39 |
| 2010/0327505 A1 * | 12/2010 | Pratt | 269/48.1 |

OTHER PUBLICATIONS

International Searching Authority, International Search Report for International Application No. PCT/BR2011/000340, Dec. 7, 2011, 3 pages, European Patent Office, The Netherlands.

International Searching Authority, Written Opinion for International Application No. PCT/BR2011/000340, Dec. 7, 2011, 5 pages, European Patent Office, The Netherlands.

* cited by examiner

SECURITY BOLT

CROSS REFERENCE TO RELATED APPLICATIONS

This application is a national stage application, filed under 35 U.S.C. §371, of International Application No. PCT/BR2011/000340, filed Sep. 22, 2011, which claims priority to and the benefit of Brazilian Application No PI1003609-1, filed Sep. 27, 2010, the contents of both of which are hereby incorporated by reference in their entirety.

BACKGROUND OF THE INVENTION

Related Field

BACKGROUND OF THE INVENTION

The present invention relates to a bolt which also serves as a seal in the sense that, once applied, the bolt cannot be removed without trace or without using a special tool.

Description of Related Art

There are several types of security or tamper-proof bolt. Generally such bolts have a threaded bolt portion and a limited torque head, that is, on tightening the bolt with a predetermined torque, the connection between the head and the bolt is broken, preventing the removal of the bolt except by using a special tool. An example is the bolt described and illustrated in U.S. Pat. No. 5,713,705.

Although such bolts are difficult to remove, they do not provide high security against tampering, because once removed, nothing prevents them from being replaced by a similar bolt. At the same time, re-authorized removal involves, in most cases, the use of a special tool. If the use of the special tools does not involve at least partial destruction of the threaded part, an unauthorized person gaining access to the tool will be able to remove and replace the screw, without leaving a trace.

It is an object of the present invention to provide a new security bolt structure that prevents removal of the bolt without leaving a trace, but, at the same time, permitting withdrawal of the bolt without using a special tool.

Another object is to provide a control by means of individually identified parts further to increase the degree of security against tampering.

BRIEF SUMMARY

According to the present invention, a security bolt comprising a bolt body formed with a screw thread and a bolt head part that can be rotated by a tool and is provided with a weakened connection that breaks when the bolt is tightened beyond a threshold torque, thus preventing unscrewing of the bolt, is characterized by further comprising:

an intermediate bolt head part connected, on the one hand, to the weakened connection and, and on the other hand, to an upper part of the bolt body by means of a second weakened connection having a greater resistance to torque than the above mentioned threshold torque of the first weakened connection, the upper part of the bolt body having a formation suitable for permitting unscrewing of the bolt body;

a ring that can be introduced over the lower end of the bolt body and has a diameter smaller than that of the intermediate bolt head part, but larger than the largest transverse dimension of the second weakened connection; and a cup-shaped cap having a closed top and a cylindrical skirt for interconnection with the ring to enclose, between the cap and ring, the bolt head part, the intermediate bolt head part and the second weakened connection, the upper surface of the closed top of the cap having a formation for cooperation with a tool and the lower inner surface of the top being configured to cooperate with a corresponding formation on the upper surface of the bolt head part to transmit rotation of the cap to the bolt head part.

It will be understood that the security bolt of this invention consists of three separate parts, namely the bolt itself, with its breakable head and the also breakable intermediate part; a ring and a cap that are locked together to contain therebetween the breakable bolt head and also breakable intermediate part. Rotation of the cover by, for example, a standard screwdriver, is transmitted via the bolt head to the threaded body until the latter is tightened to its torque limit. Continued rotation will break the weakened connection between the head and the intermediate part so that such continued rotation of the cover (the only part accessible from the outside) is no longer transmitted to the threaded body, as also reverse the rotation cannot unscrew it.

The bolt head, however, is trapped inside the cover.

When the bolt is to be removed, any tool can be applied against the side of the cover, tilting it until the second weakened connection is broken. When this occurs, the cover can be removed along with the bolt head, the intermediate part and the ring, leaving visible at the top of the threaded part a formation (preferably, a rib) that can be used to unscrew the bolt using pliers or even a user's hand.

Preferably, the bolt body of screw and the cover have identical (or complementary) identifications for making it even more difficult for tampering without trace.

BRIEF DESCRIPTION OF THE FIGURES

The present invention will be better understood from the following detailed description, given merely by way of example, of presently preferred embodiments of the invention, reference being made to the accompanying drawings, in which.

DETAILED DESCRIPTION OF VARIOUS EMBODIMENTS

Figure 1:
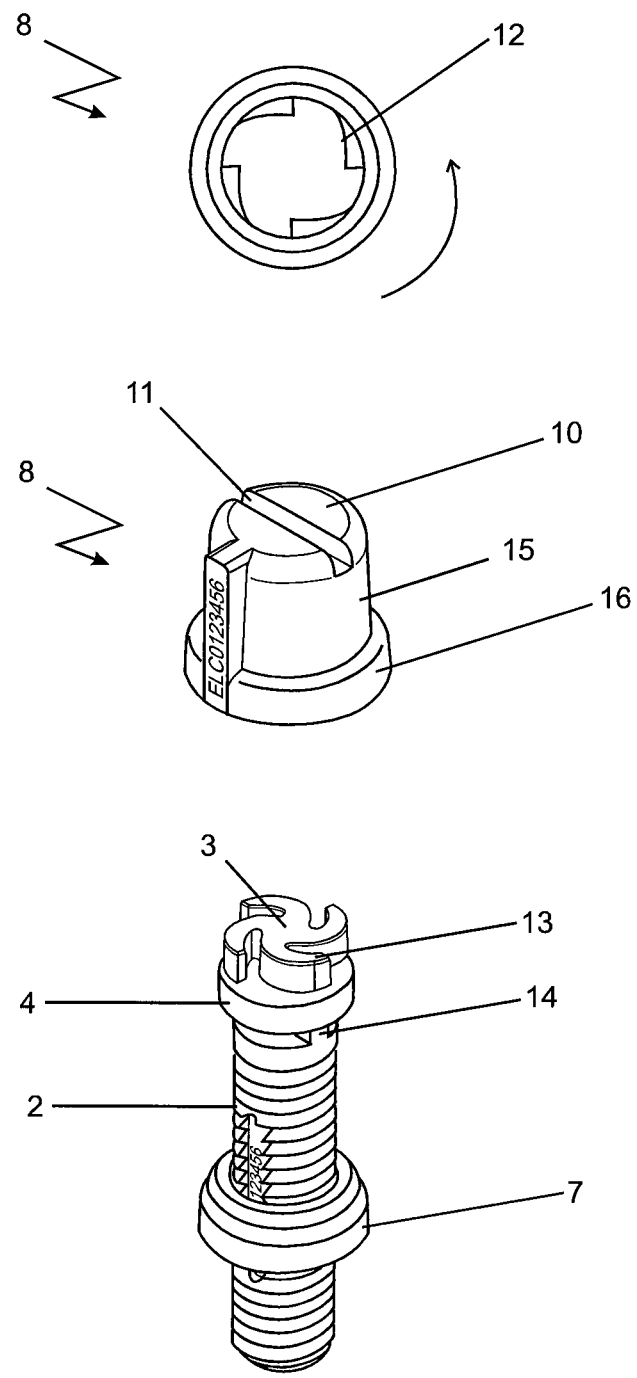
FIG. 1: a perspective view of a security bolt according to the presently preferred embodiment of the present invention, showing the bolt screw, its cover and its lower ring, prior to assembly.
Figures 2, 3:
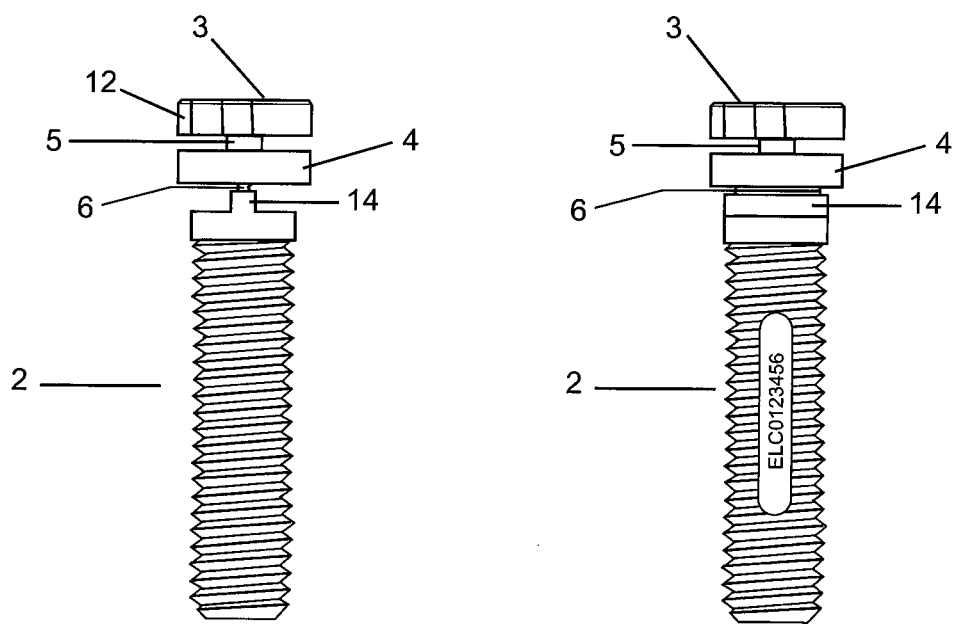
FIG. 2: a side elevation of the bolt screw of FIG. 1.
FIG. 3: a front elevation of the same bolt screw and the ring.

Referring now to the drawings, FIGS. 1 to 4 show a security bolt 1 according to a currently preferred embodiment of this invention.

Security bolt 1 consists of three distinct parts, namely:

a) the screw consisting of a threaded screw body 2, a bolt head 3, an intermediate part 4 and two weakened connections 5 and 6 connecting the intermediate part 4 to the bolt head 3 and body 2, respectively; and b) a ring 7 which receives the lower end of the threaded body 2; and c) a cover 8 in the form of an inverted cup covering the bolt head 3 and the intermediate part 4, for engagement in a groove 9 behind a peripheral rib 18 on coupling ring 7.

Cover 8 has a closed top 10 formed with an external slot 11 to permit its rotation by means of a screwdriver. It will be understood, however, that the slot 11 could be replaced by any other formation that allows rotation to be transmitted to the cover by means of an appropriate tool. Alternative tool-receiving formations are shown, by way of further example, in FIGS. 14a to 14d.

The lower inner surface of top 10 of cover 8 also has a formation that allows the transmission of a clockwise rotation, that is to say, in a screwing direction. In the case illustrated in FIGS. 1 to 4 of the drawings, the formation is of a ratchet 12.

The ratchet formation 12 is designed to cooperate with a complementary ratchet formation 13 on the upper surface of the bolt head 3.

When the security bolt is assembled (see FIGS. 4 and 4a), the rotation of cover 8 by means of a screwdriver in slot 11, will turn the screw body 2 in the tightening direction, but not in the opposite unscrewing direction.

FIGS. 10, 11, 12 and 13 show four other alternatives 13a, 13b, 13c and 13d for forming the upper surface of bolt head 3, and the corresponding formations on the lower surface of the cap 8 will be the mirror image thereof. Formation 13a has a hexagonal nut shape, formation 13b is a slot, formation 13c is a hexagonal recess (the opposite of 13a) and formation 13d is an irregular recess with a central protuberance. It will be apparent that other configurations may be used, although it should be noted that only the ratchet formation of FIGS. 1 to 4 will prevent any anti-clockwise unscrewing tendency of the screw before the weakened connection 5 between bolt head 3 and intermediate part 4 breaks.

Intermediate part 4 is disc shaped and attached to the bolt head 3 by the first weakened connection 5 and to screw body 2 by the second weakened connection 6. This second weakened connection 6 is significantly more resistant to torque than first weakened connection 5, so that connection 6 will not break when the torque applied by the rotation of cap 8 reaches the threshold value that determines the torque breaking point of first weakened connection 5. In practice, weakened connection 5 is a small diameter cylindrical pin that ruptures when the applied torque exceeds the torque required for normal application of the screw, as will become apparent later.

The second weakened connection, however, consists of a small diametrical rib 6 has a greater torque resistance, but is ruptured when intermediate part 4 is forced to bend, as will be mentioned later.

Most of the length of screw body 2 is occupied by a threaded portion. Above the threaded section, there is a diametrical rib 14 and it is on the upper surface of rib 14 that rib 6, that is to say, the second weakened connection, is formed. Thus, when rib 6 ruptures and rib 8 is exposed, the rib can be used to unscrew screw body 2, either manually or by using a tool such as a pliers.

The cover 8 has a skirt that extends downwardly from the perimeter of the closed top 10. The major part 15 of the skirt has an inner diameter substantially equal (slightly larger) to the outer diameter of intermediate part 4, after which the skirt portion 16 expands to a larger diameter, to receive the top of ring 7. With a view to snap engagement with ring 7, the skirt has a protuberance 17 around its inner bore, precisely at the end of section 15 and immediately before a larger diameter section 16.

The ring 7, on the other hand, has an inner diameter slightly larger than the outside diameter of the threaded portion of screw body 2 and smaller than the outer diameter of the intermediate part 4. In its upper outer region, ring 7 is formed with a circumferential groove 9 intended for engagement by the protuberance 17 on the skirt of cap 8.

Figure 4:
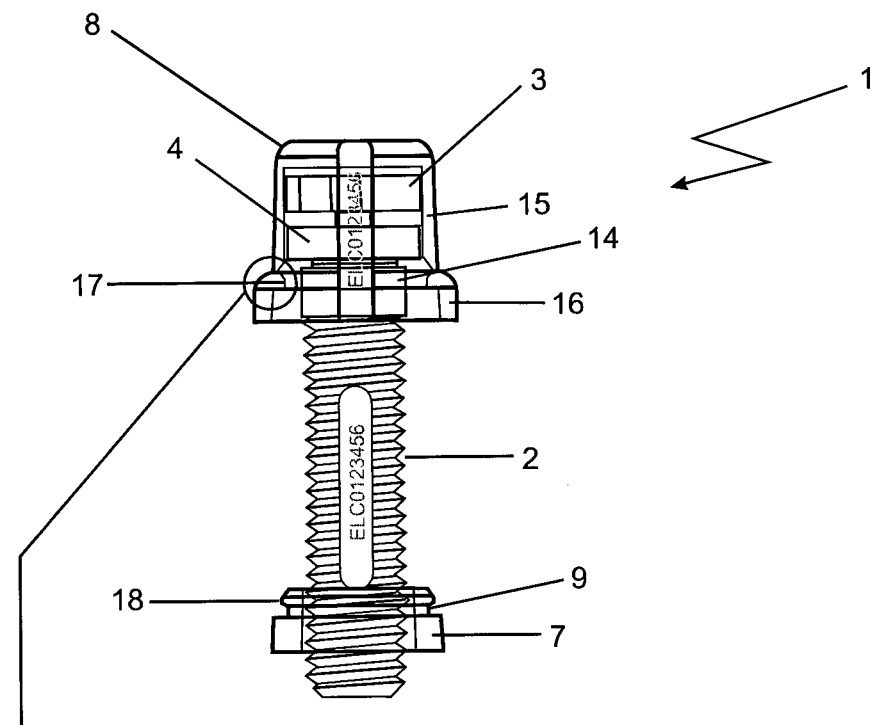
FIG. 4: a view of the bolt screw during assembly.
Figure 4A:
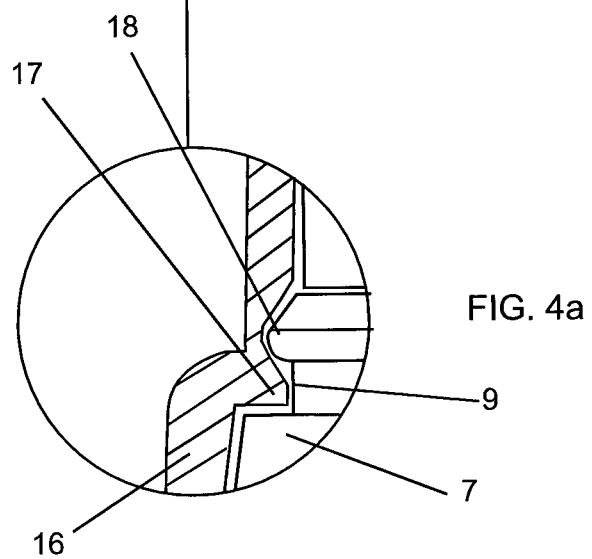
FIG. 4a: a detail of FIG. 4, as indicated, showing, demonstrating the fit of the ring on the cover.

Before use, a security bolt is "assembled" by inserting ring 7 over the lower end of screw body 2, ring 7 then being slid upwardly (see FIGS. 1 and 4a) until it abuts the lower surface of intermediate part 4 (see FIGS. 4 and 4a). At the same time, cap 8 is placed over the bolt head 3, its skirt thus surrounding head 3 and the two weakened connections 5 and 6, as well as intermediate part 4, it then being forced over the upper rib 18 on ring 7 so that its inner circumferential protuberance 17, by elastic deformation of the skirt, snaps into groove 9 (see FIGS. 4 and 4a). The "assembled" bolt is then ready for use. The detail of FIG. 4a clearly shows the snap coupling of the protuberance 17 into groove 9 of the ring after the ring 7 has been moved up from the position shown in FIG. 4.

Finally, both the threaded portion of the screw body 2 and the outer surface of the skirt of cap 8 are individualised by means of an alphanumeric marking in high relief or an electronic identification device such as a RFID to be embedded in the bolt screw. In FIGS. 1 to 14 and 16 of the drawings, an identical identification (ELC0123456) is visible on both parts, but it will be understood that any other type of identification could be used, as also the identifications on the two parts may be complementary rather than identical, depending on the security system adopted by the user.

In the case of the security bolts illustrated in FIGS. 14a, 14b, 14c, 14d, 15a, 15b and 16, the marking on cap 8 is formed not only on the side but also on the top 10 so as to ensure visibility, especially in situations such as shown in FIGS. 5 to 8 where the cap is received in a recess and consequently any identification on its side will not easily be viewed when the bolt is in use.

Figure 15A:
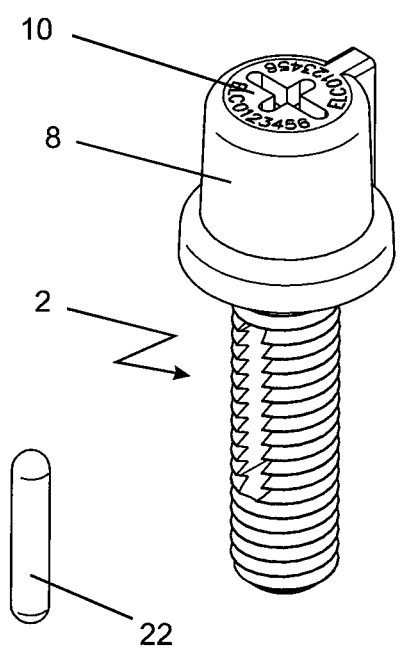
FIGS. 15a and 15b show an alternative embodiment in which the security screw is individualised for identification purposes by means of an electronic chip.
Figure 15B:
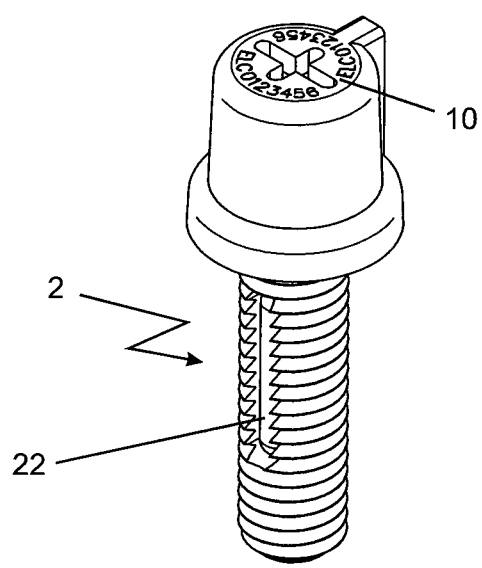

FIGS. 15a and 15b also illustrate an example where the identification on the threaded bolt screw body 2 comprises a RFID chip 22 that is inserted into body 2 in the manner illustrated.

The use of the security bolt of the present invention is very simple and illustrated in FIGS. 5, 6, 7, 8 and 9. These figures show the cover 19 of a housing or the like closed onto the housing body 20. The cover 19 is provided with a recess 21 where the security bolt is to be applied, the recess preferably having a diameter slightly larger than the diameter of the larger diameter section 16 of the skirt of cap 8.

Figure 5:
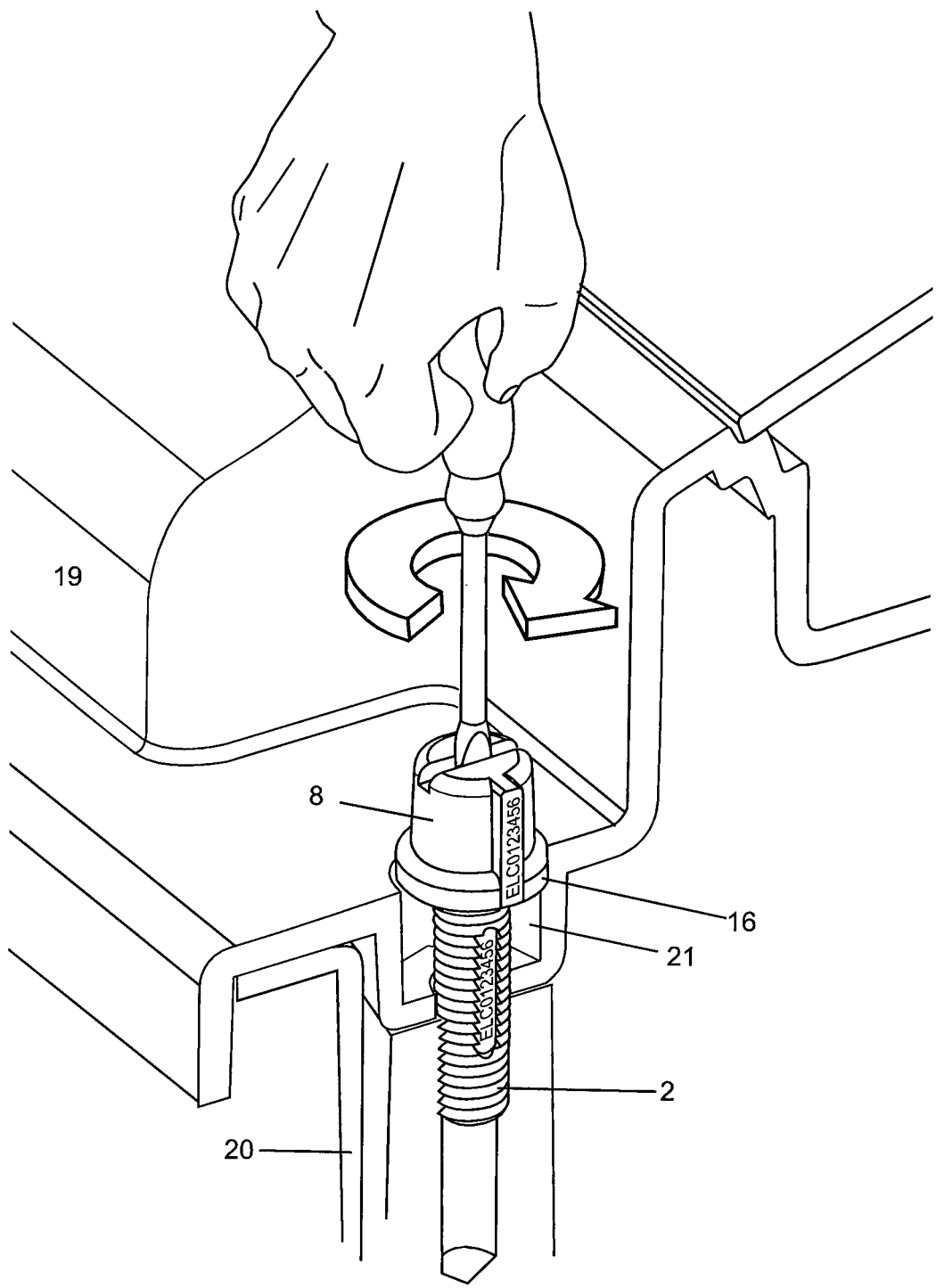
FIG. 5: a view showing the security bolt at the beginning of its assembly on the closure of a housing being closed and sealed.
Figure 6:
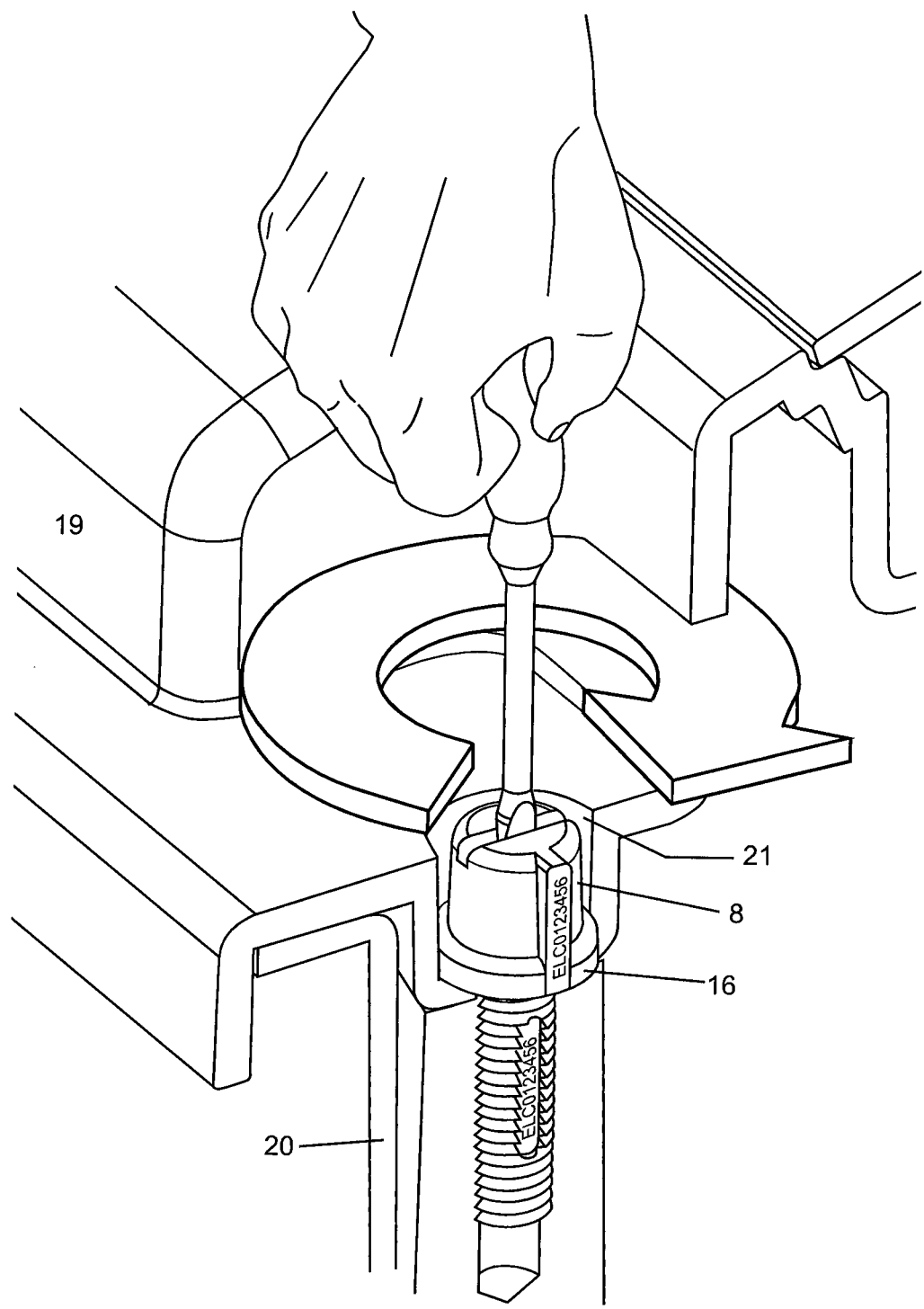
FIG. 6: a view similar to FIG. 5, but showing the security bolt at a moment prior to final installation.
Figure 7:
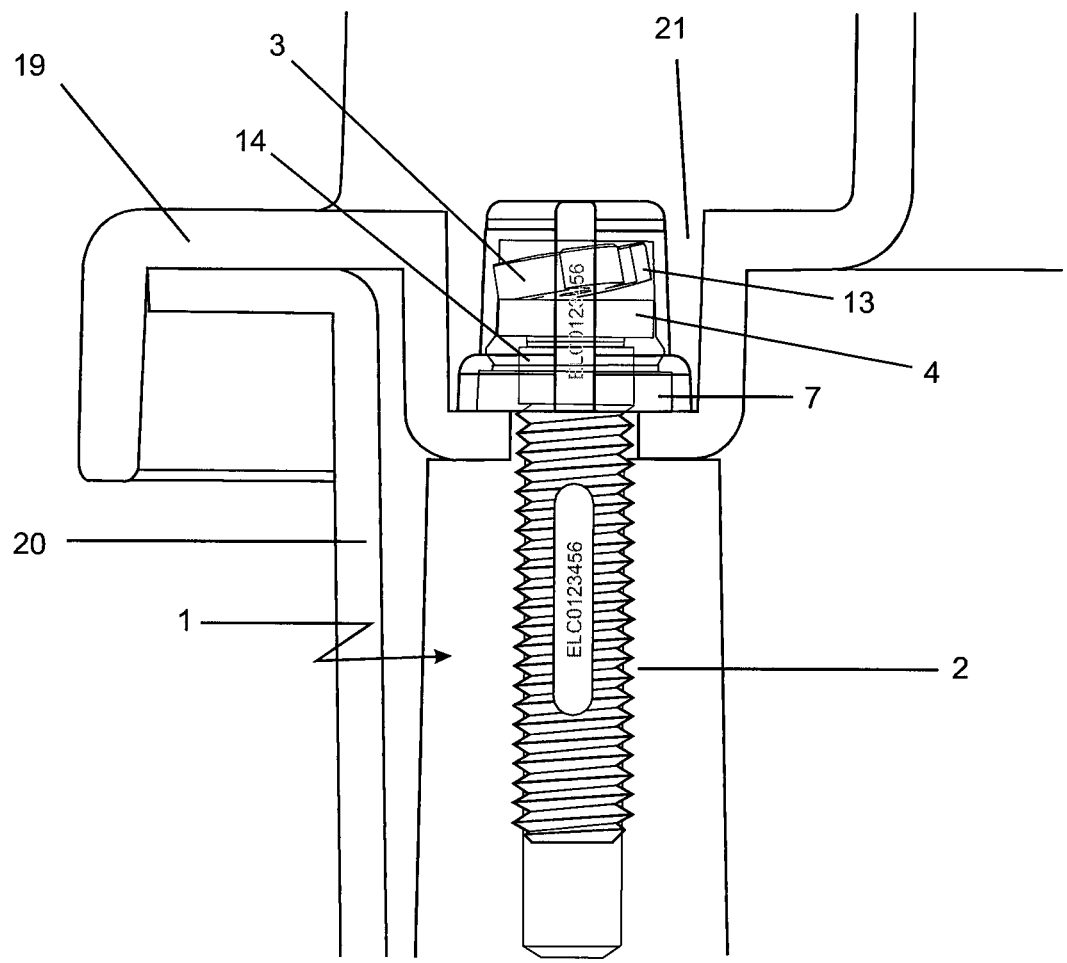
FIG. 7: a view showing the security bolt at the end of its installation when closing and sealing a housing.

FIG. 5 shows the bolt at the beginning of its introduction into its respective orifice, at which time the rotation of cap 8 by means of a screwdriver causes the bolt head 2 with cap 8 to start to enter into recess 21. During this operation, rotation of the cap is transmitted through the ratchet formations 12 and 13 (see FIG. 1) on the underside of the top 10 of the cap and on the upper surface of bolt head 3. Thus, the screwdriver freely rotates screw body 2 that enters normally into the corresponding thread in the orifice in housing body 20.

With continued rotation of cap 8, the bottom edge of its skirt reaches the bottom of recess 21. At this point (see FIG. 6), with the bottom edge of the cap skirt resting on the bottom 8 of recess 21, continued rotation of cover 8 by the screwdriver will apply a torque that exceeds the strength of the first weakened connection 5, leading to rupture of connection 5 (see FIGS. 1 and 7). As a result, further rotation of cap 8 will be in false, with no transmission of movement to the intermediate part 6 or to screw body of 2. At the same time, cap 8 will remain attached to a security bolt, because it is attached to the ring 7 due to the coupling between protuberance 17 and groove 9 in ring 7 which, in turn, is trapped beneath intermediate part 4.

Figure 8:
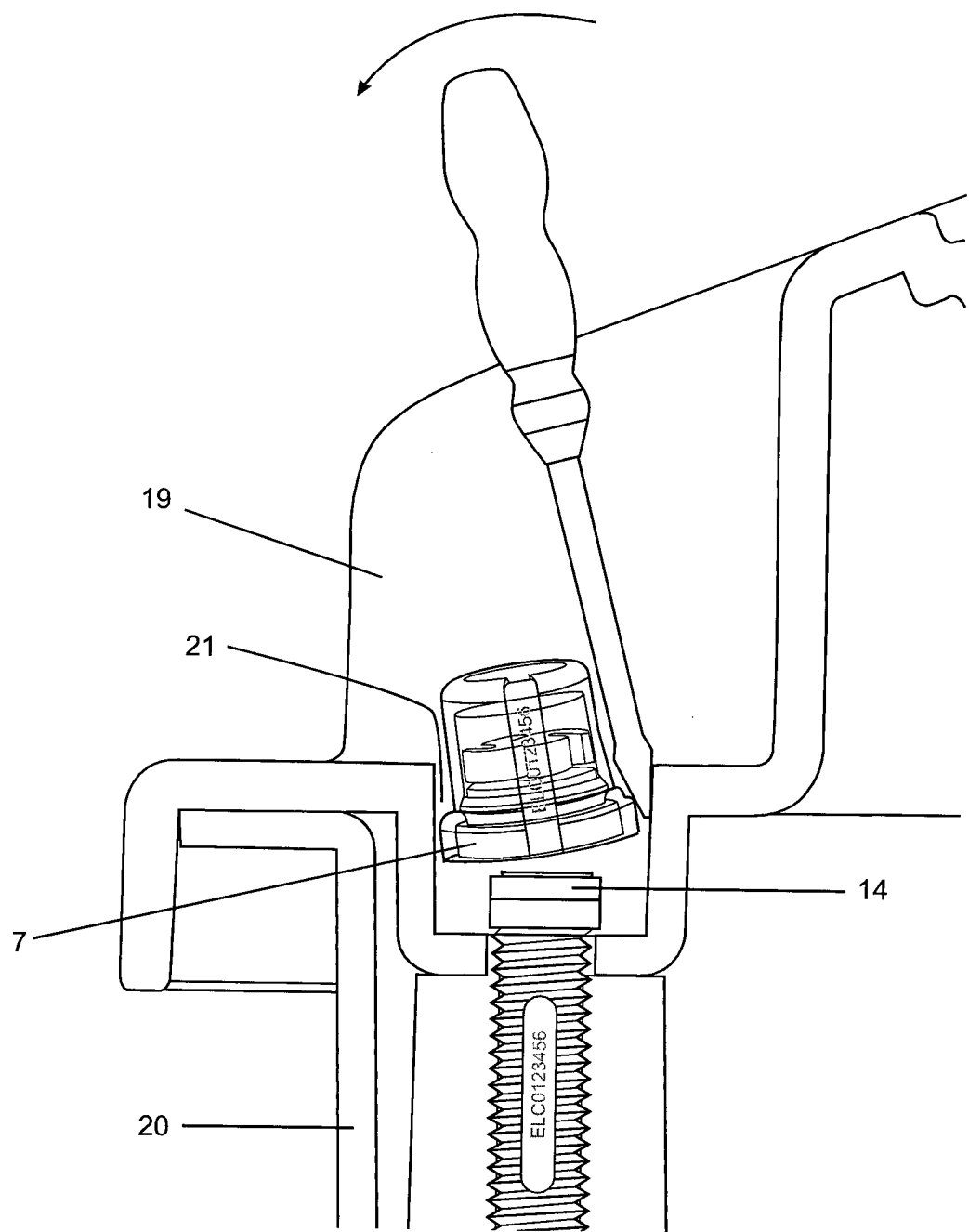
FIG. 8: a view similar to that of FIGS. 5, 6 and 7, however, during removal of the security bolt.
Figure 9:
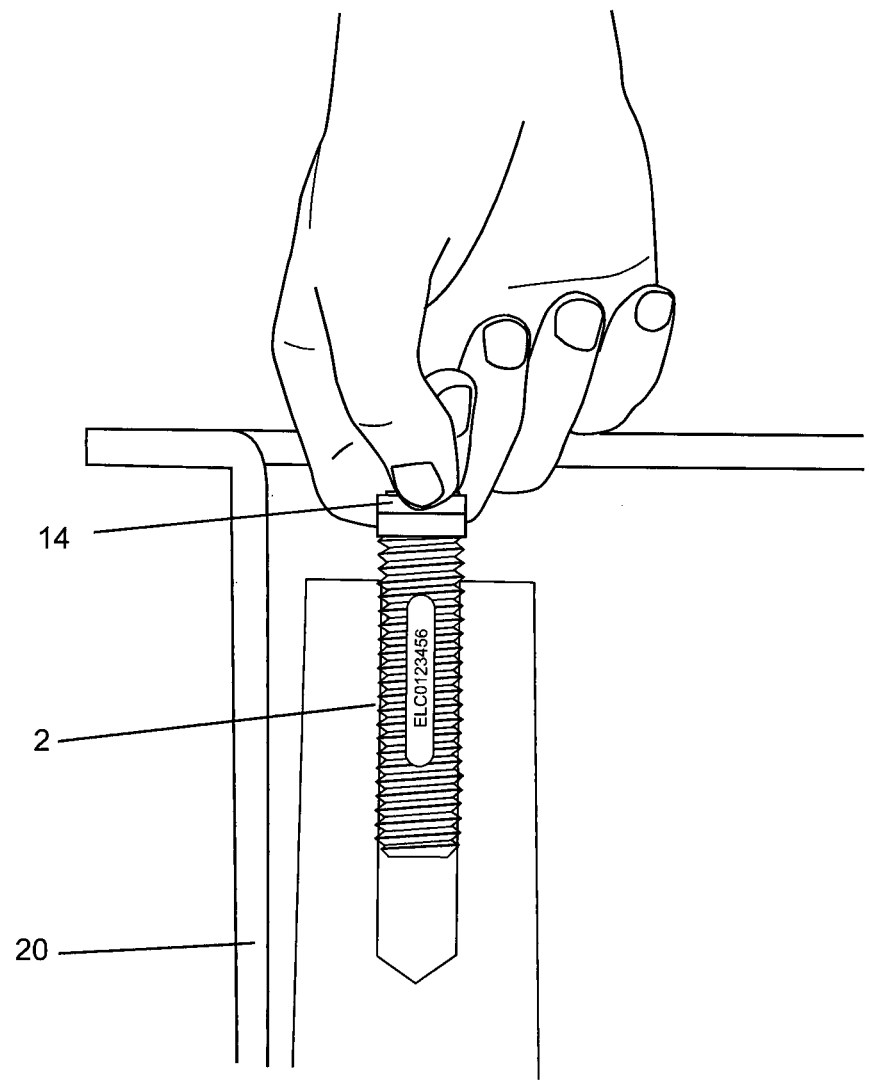
FIG. 9: shows the manual removal of the bolt screw.
Figure 10:
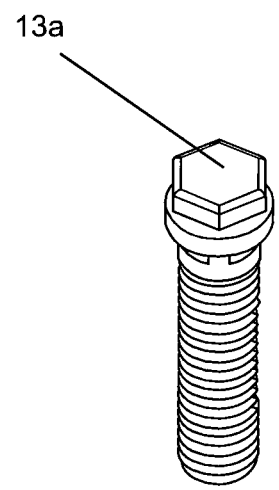
FIGS. 10 through 13 are perspective views of four alternative configurations to the bolt screw.
Figure 11:
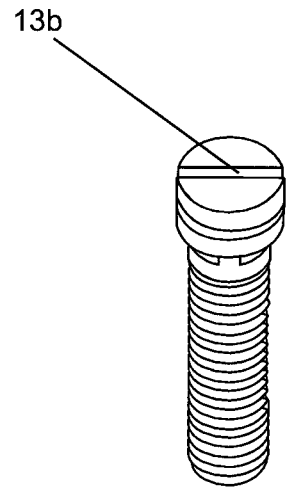
Figure 12:
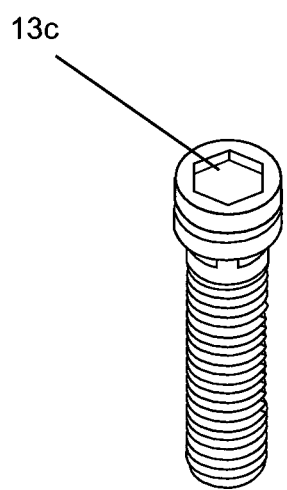
Figure 13:
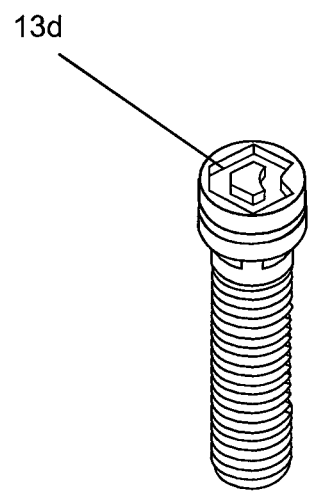
Figure 14A:
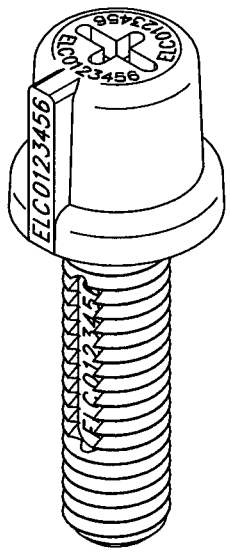
FIGS. 14a-14d are perspective views of security bolts according to the invention having different tool receiving formations on their covers.
Figure 14B:
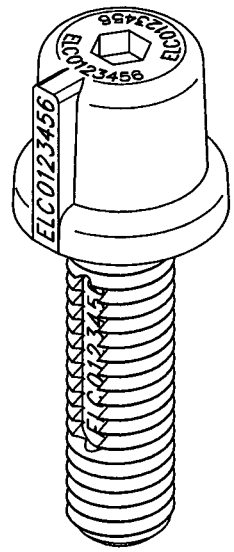
Figure 14C:
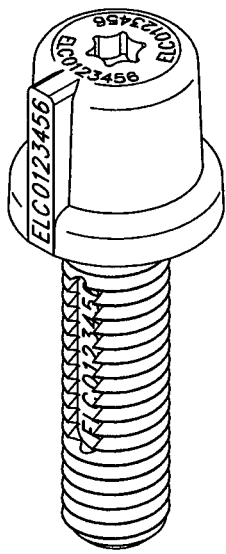
Figure 14D:
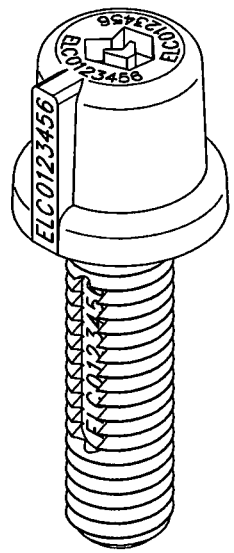

To remove the bolt, see FIGS. 8 and 9, it is sufficient to insert a tool (a screwdriver, for example) between the inside of recess 21 and the skirt of the cap 8 and then force the lid to incline laterally until the second weakened connection 7 ruptures. At this point, the whole assembly comprising cap 8, ring 7, screw head 3 and intermediate part 4 may be withdrawn, thus exposing screw body 2 with its upper rib 14. The screw body 2 can then be unscrewed and removed, either manually (FIG. 9), or using a pair of pliers or the like.

It should be observed that cap 8 and screw body 2 carry identification that personalise the security bolt, whereby there is no possibility of replacing the screw body, which is already damaged, by another, due to the cap having a different identification.

Figure 16:
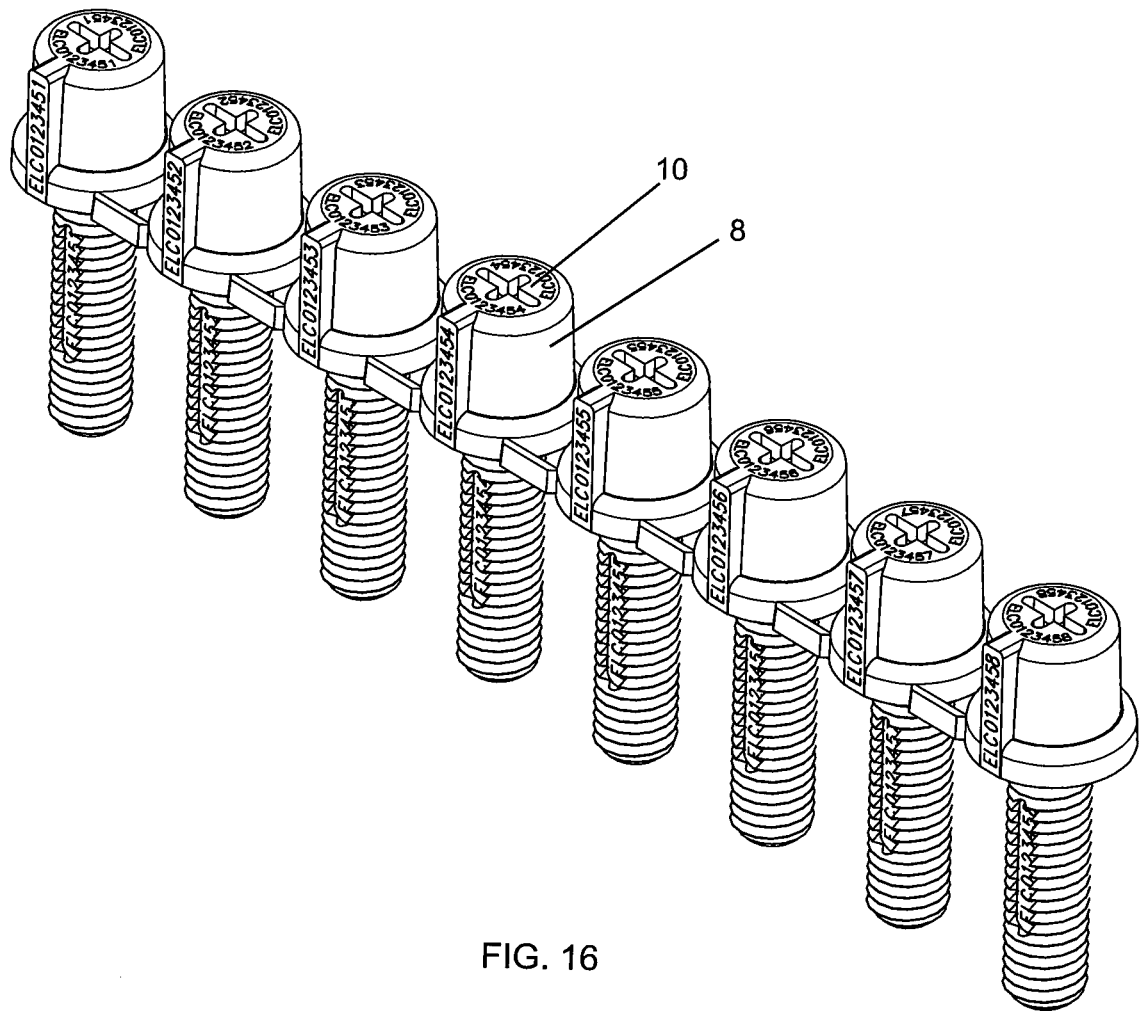
FIG. 16 is a perspective view of a preferred manner of presenting a set of individualised security bolts according to the invention.

Finally, FIG. 16 shows a preferred manner of presenting security bolts according to the invention. It will be seen that groups of, in this case, eight security bolts 1 are produced with their caps 8 joined to each other by rupturable connectors 22 and that the identifications on the bolts of the groups are sequential (in the illustrated case, ELC0123451 to ELC0123458) bolt so that, when the security bolts 1 are mounted, they form units of eight that contain sequentially numbered bolts. This facilitates handling and control by the user.

The present invention has been described above with reference to presently preferred embodiments with various options for the formations designed for transmitting rotation between the cap and screw head. However, it will be understood that other physical arrangements could be devised using the same concept of this invention. For example, the bottom of the skirt of the cap could have a double wall defining an annular space for receiving an upper edge of the ring, provided that the ring is prevented from passing through the intermediate part while the second weakened connection is still intact.

The invention claimed is:

1. A security bolt comprising:
   an integral part having a threaded screw body (2), a bolt head portion (3) and an intermediate bolt head portion (4) between an upper end of said threaded screw body (2) and said bolt head portion (3), said upper end of said threaded screw body having a formation (14) suitable to facilitate unscrewing of the screw body (2), wherein:
   said bolt head portion (3) is rotatable by a tool and connected to said intermediate bolt head portion (4) by means of a first connection (5) that ruptures when subject to a first predetermined torque threshold; and
   said intermediate bolt head portion (4) is connected to said formation (14) at the upper part of said threaded screw body (2) by means of a second connection (6) that ruptures when subject to a second predetermined torque threshold greater than said first predetermined torque threshold;
   a ring (7) having a diameter smaller than said intermediate head portion (4), but larger than the largest transverse dimension of the second connection (6), said ring being positioned around said threaded screw body (2); and
   a cup-shaped cap (8) having a closed top (10) and a cylindrical skirt snap fitted to said ring (7) whereby said cap (8) and said ring (7) together enclose said bolt head portion (3), said intermediate bolt head portion (4) and said second connection (6), wherein:
   an upper surface of said closed top (10) of said cap (8) has a formation (11) for cooperation with a tool and a lower inner surface (12) of said top (10) is configured to cooperate with a corresponding formation (13) on the upper surface of the bolt head portion (3) to transmit unidirectional rotation of the cap (8) to said bolt head part (3) in the screwing direction of the security bolt, and
   said screw body (2) is provided with a security identification and said cap (8) is provided with at least one of an identical or a complementary identification.

2. A security bolt according to claim 1, wherein said skirt of the cap (8) is elastically snap-fitted externally over said ring (7).

3. A security bolt according to claim 1, wherein said security identifications are at least one of numeric and alphanumeric.

4. A security bolt according to claim 1, wherein the formation suitable to facilitate unscrewing of said screw body (2) comprises a rib (14) and said second weakened connection (6) joins the rib (14) to said intermediate bolt head portion (4).

5. A security bolt according to claim 1, wherein said formation for cooperation with a tool on the upper surface of the cap (8) is a slot (11) for receiving a screwdriver.

6. A security bolt according to claim 1, wherein said lower surface of the closed top (10) of said cap (8) and the corresponding formation (13) on the upper surface of said head portion (3) cooperate in the form of a ratchet to transmit unidirectional rotation in the screwing direction of the security bolt.

7. A security bolt according to claim 1, wherein the formation on the lower surface of the closed top (10) of said cap (8) and the corresponding formation (13a, 13b, 13c) on the surface of the head portion (3) cooperate in the form of a recess and a corresponding protuberance.

8. A security bolt according to claim 7, wherein the recess and protuberance (13a, 13c) are hexagonal.

9. A security bolt according to claim 7, wherein the recess is a slit (13b) and the protuberance is a rib.

10. A security bolt according to claim 1, wherein the formation on the bottom surface of the closed top (10) of said cap (8) and the corresponding formation on the surface of the head portion (3) include, on one side, a recess with a protuberance on its exposed face and on the other side, a recess with a protuberance upstanding from its bottom (13d).

* * * * *